United States Patent
Reial et al.

(10) Patent No.: US 9,351,312 B2
(45) Date of Patent: May 24, 2016

(54) SYSTEM AND METHOD FOR PROVIDING AND USING RADIO NETWORK TEMPORARY IDENTIFIERS SIGNATURES FOR INTERFERENCE CANCELLATION

(71) Applicant: Telefonaktiebolaget L M Ericsson (publ), Stockholm (SE)

(72) Inventors: Andres Reial, Malmö (SE); George Jöngren, Sundbyberg (SE); Lars Lindbom, Karlstad (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 77 days.

(21) Appl. No.: 14/490,134

(22) Filed: Sep. 18, 2014

(65) Prior Publication Data

US 2015/0078302 A1     Mar. 19, 2015

Related U.S. Application Data

(60) Provisional application No. 61/879,708, filed on Sep. 19, 2013.

(51) Int. Cl.
| | |
|---|---|
| *H04W 4/00* | (2009.01) |
| *H04W 72/12* | (2009.01) |
| *H04L 5/00* | (2006.01) |
| *H04W 72/04* | (2009.01) |

(52) U.S. Cl.
CPC ......... *H04W 72/1226* (2013.01); *H04L 5/0053* (2013.01); *H04W 72/042* (2013.01)

(58) Field of Classification Search
CPC ........... H04W 72/1226; H04W 72/042; H04L 5/0053
See application file for complete search history.

(56) References Cited

U.S. PATENT DOCUMENTS

2008/0139214 A1* 6/2008 Sun ................ H04W 72/042
455/450

(Continued)

FOREIGN PATENT DOCUMENTS

| EP | WO2010/108136 | * | 9/2010 | ............ H04W 72/08 |
|---|---|---|---|---|
| WO | WO 2010/108136 A1 | | 9/2010 | |
| WO | WO 2013/133747 A2 | | 9/2013 | |

OTHER PUBLICATIONS

PCT Notification of Transmittal of the International Search Report and the Written Opinion of the International Searching Authority, or the Declaration for International application No. PCT/IB2014/064661, Jan. 20, 2015.

*Primary Examiner* — Robert Wilson
(74) *Attorney, Agent, or Firm* — Baker Botts LLP

(57) ABSTRACT

According to certain embodiments, methods and systems for providing device-specific radio network temporary identifiers (C-RNTI) signatures may be provided for interference cancellation. The methods and systems may include assigning a subset of C-RNTIs to a cell. A mapping may be defined between the subset of C-RNTI signatures and a set of C-RNTI indices. Each C-RNTI signature within the subset may be identifiable by a first wireless device via the mapping. The mapping between the subset of C-RNTI signatures and the set C-RNTI indices may be provided to the first wireless device. A C-RNTI indices indicating at least one currently scheduled wireless device may be provided to the first wireless device.

46 Claims, 9 Drawing Sheets

(56) References Cited

U.S. PATENT DOCUMENTS

| | | | |
|---|---|---|---|
| 2008/0233941 A1* | 9/2008 | Jen | H04W 74/002 455/418 |
| 2009/0161618 A1* | 6/2009 | Johansson | H04W 72/0446 370/329 |
| 2010/0190447 A1 | 7/2010 | Agrawal et al. | |
| 2014/0120967 A1* | 5/2014 | Purnadi | H04W 72/1226 455/501 |
| 2014/0293971 A1* | 10/2014 | Yoo | H04W 56/003 370/336 |
| 2015/0078302 A1* | 3/2015 | Reial | H04L 5/0053 370/329 |

* cited by examiner

SYSTEM AND METHOD FOR PROVIDING AND USING RADIO NETWORK TEMPORARY IDENTIFIERS SIGNATURES FOR INTERFERENCE CANCELLATION

PRIORITY

This non-provisional application claims the benefit of U.S. Provisional Patent Application No. 61/879,708, filed Sep. 19, 2013 and entitled "Broadcasting RNTI".

TECHNICAL FIELD

Particular embodiments relate generally to wireless communications and more particularly to a system and method for providing interference characteristics for interference mitigation.

BACKGROUND

To meet higher capacity demands and to enhance user experience, cellular communications network are increasing the number of base stations employed. One approach for increasing the density of base stations is achieved by cell splitting macro cells in highly loaded geographical areas. Specifically, the macro cell may be split into multiple small cells in highly loaded geographical areas. These highly loaded areas may be considered traffic hotspots within the coverage area of the macro cell. This densification of the underlying support for the cellular network may allow radio resources to be reused. Additionally, because wireless devices may be closer to the serving base station, wireless devices may achieve higher bitrates.

Another approach for meeting high capacity demands is to employ a mixture of macro cells and small cells with overlapping coverage areas within the cellular network. This type of cellular network may be referred to as heterogeneous networks (HetNets). Such networks may be an important complement to macro cell splitting. One example includes a cellular network having clusters of pico cells within the macro coverage area to offload macro traffic. A pico base station provides service to a pico cell. Typically, a pico base station is a low power node (LPN) that transmits with low output power and covers a much smaller geographical area than a high power node, such as a macro base station. Other examples of low power nodes are home base stations and relays.

Though the presence of additional base stations increases system performance and improves user experiences, such networks are not without its disadvantages. One such disadvantage may be that the wireless devices served by the network may experience lower geometries. As a result, downlink inter-cell interference may be more pronounced and the achievable bit rates may be limited. To mitigate inter-cell interference, mitigation techniques have been employed to improve user performance. Such techniques may explore the structure of the physical layer transmission of the radio access technology.

One technique for mitigating inter-cell interference includes frequency separation between the different layers of the network. For example, the macro cell and pico cells may operate on different non-overlapping carrier frequencies and thereby avoid any interference between the layers. With no macro cell interference towards the under laid cells, cell splitting gains may be achieved when all resources may simultaneously be used by the macro cell and pico cells. However, a disadvantage of operating layers on different carrier frequencies may be resource-utilization inefficiency. For example, when activity levels in the pico cells are low, the network may be operated more efficiently using all carrier frequencies in macro cell and disregarding the pico cells. However, because the split of carrier frequencies across layers is typically done in a static manner, operation of the network may not be adjusted based on the activity levels in the pico cells.

Another related technique for efficient operation of a heterogeneous includes sharing radio resources on same carrier frequencies by coordinating transmissions across a macro cell and the pico cells. This type of coordination refers to as inter-cell interference coordination (ICIC) in which certain radio resources are allocated for the macro cells during some time period whereas the remaining resources can be accessed by the under laid cells without interference from the macro cell. Depending on the traffic situations across the layers, this resource split can change over time to accommodate different traffic demands. In contrast to using a split of carrier frequencies between the macro cell and the pico cells, the ICIC sharing radio resources across layers can be made more or less dynamic depending on the implementation of the interface between a base station and the low power nodes. For example, in LTE, an X2 interface has been specified in order to exchange different types of information between network node and low power nodes. One example of such information exchange is that each low power node may be capable of informing other low power nodes and the base station that it will reduce its transmit power on certain resources. However, time synchronization between the low power nodes is required to ensure that ICIC across layers will work efficiently in the heterogeneous network. This is in particular of importance for time domain based ICIC schemes where resources are shared in time on the same carrier.

Interference mitigation may take place on the transmitter side, the receiver side, or on both sides. Interference mitigation on the transmitter side includes those methods that seek to coordinate the physical channel transmissions across cells to avoid severe interference. For example, an aggressor base station may occasionally mute its transmissions on certain radio resources in order for a victim base station to schedule interference sensitive wireless devices on radio resources with reduced interference.

LTE features that seek to coordinate transmissions, on the network side, have been specified in the context of inter-cell interference coordination (ICIC) and coordinated multipoint transmissions (CoMP). In the case of ICIC, for example, a network node such as an eNode B may send a message over the LTE inter-eNB interface (X2). The message may include coordination information that a receiving network node, such as another, may use when scheduling interference sensitive wireless devices. As such, competing transmissions may be coordinated to avoid inter-point interference. As another example, CoMP may use a cluster of transmission points, or base stations, to jointly and synchronously transmit the same signals and thereby increase the received power on the desired signals.

The following ICIC messages over X2 have been specified in TS 36.423:
  Uplink (UL) Overload Interference Indication (OII) indicates the interference level (low, medium, high) per resource block (RB) experienced by the indicated cell on all RBs.
  UL High Interference Indication (HII) indicates the occurrence of high interference sensitivity per RB, as seen from the sending.

Received Narrow Transmit Power (RNTP) indicates per RB whether DL transmission power is lower than the value indicated by a threshold.

Almost Blank Subframe (ABS) pattern indicates the subframes on which the sending will reduce power for some physical channels and/or reduced activity.

The X2 messages OII, HII and RNTP represent methods for coordinating physical data channel transmissions in the frequency domain across cells. In contrast, the ABS message is a time domain mechanism to primarily protect reception of PDCCH, PHICH and PDSCH in the small cells. ABS allows macro cells to occasionally mute or reduce transmit power on PDCCH/PDSCH in certain subframes. The ensures backwards compatibility towards wireless devices by continuing transmission of necessary channels and signals in the ABS pattern for acquiring system information and time synchronization.

On the receiver side, advanced receivers employing enhanced interference suppression schemes, maximum likelihood techniques and interference cancellation techniques are gaining popularity. Such advanced receivers operate to mitigate downlink (DL) interference arising from neighbor-cell transmissions to wireless devices in neighboring cells. Specifically, such receivers may explicitly remove all or parts of the interfering signal.

Generally, such receivers may be categorized into 3 families:

Linear receivers whose aim is to suppress the interference by exploiting an explicit channel estimation of the interfering signal(s).

Non-linear receivers such as ML detection (iterative or non-iterative).

Non-linear receivers such as Interference Cancellation (IC) receivers which explicitly cancel the interference from the received signal. IC receivers may be iterative or non-iterative.

One specific type of receiver may use interference rejection combining (IRC) for mitigating inter-cell interference. IRC is a technique for suppressing interference, which requires estimation of an interference/noise covariance matrix. Another type of receiver for mitigating interference may include interference cancellation (IC) receivers that operate to estimate unwanted signals (intra/inter-cell interference). As an example, an IC receiver in the victim wireless device may operate to demodulate and optionally decode the interfering signals, produce an estimate of the transmitted and the corresponding received signal, and remove that estimate from the total received signal to improve the effective signal-to-noise ratio (SINR) for the desired signal. In post-decoding IC receivers, the interfering data signal is demodulated, decoded, its estimated contribution to the received signal is regenerated, and subtracted. In pre-decoding receivers, the regeneration step is performed directly after demodulation, bypassing the channel decoder. The preferred mode to perform such cancellation may include applying soft signal mapping and regeneration rather than hard symbol or bit decisions. Additionally or alternatively, maximum likelihood receivers may be used to jointly detect the desired signals and the interference signals in accordance to the maximum likelihood criterion. Iterative maximum likelihood receivers may be defined to exploit the decoding of the interfering signals.

Both IRC and IC are wireless device reference receiver techniques in LTE. However, IC in LTE is currently restricted to cancellation of always-on signals, such as the CRS, in which the network assists the wireless device on how these signals are transmitted in the aggressor cells. The two interference cancellation approaches differ by the achievable cancellation efficiency. Stated differently, the fraction of the impairment power left after the cancellation operation may be essentially equal in some scenarios and vary significantly in others. While the post-decoding IC approach may provide superior performance at "high" SIR operating points, these approaches have differing computational resource requirements. For example, the described post-decoding solution implies turbo decoding processing. Additionally, the processing delay incurred may vary by technique. For example, the post-decoding solution requires buffering the entire code block of the interfering signal.

To apply these advanced interference cancellation techniques to signals originating from other cells, knowledge of certain signal format parameters may be required to configure the receiver. For pre-decoding IC, the resource allocation, modulation format, any pre-coding applied, the number of layers, etc. may be useful, and may be obtained via blind estimation, eavesdropping other-cell control signaling, or via NW assistance features. For post-decoding, additional transport format parameters are required which may typically only be obtained from receiving or eavesdropping the related control signaling.

However, the different types of receivers may require differing information and/or parameters and are required to estimate blindly all the parameters needed for the receiver implementation. Additionally, the multitude of communication standards applicable to LTE may include many features which may need to be supported by the wireless device but which will not be used by a network (depending on the configuration) and may make blind detection difficult and complex. Currently no signaling is defined in LTE standard in order to provide wireless devices with the assistance which may be needed in order to implement advanced receivers with limited complexity.

SUMMARY

According to some embodiments, systems and methods are provided that include providing interference cancellation assistance by a network node to a first wireless device for use in performing interference cancellation.

In one example embodiment, a method for providing device-specific radio network temporary identifiers (C-RNTI) signatures by a network node is provided. The method may include assigning a subset of C-RNTIs to a cell. A mapping may be defined between the subset of C-RNTI signatures and a set of C-RNTI indices. Each C-RNTI signature within the subset may be identifiable by a first wireless device via the mapping. The mapping between the subset of C-RNTI signatures and the set C-RNTI indices may be provided to the first wireless device. A C-RNTI indices indicating at least one currently scheduled wireless device may additionally be provided to the first wireless device.

In another example embodiment, a method for retrieving C-RNTI signature information for performing interference cancellation by a wireless device is provided. The method may include receiving, by the wireless device, a mapping between a subset of C-RNTI signatures and a subset of C-RNTI indices, the mapping received from a network node. C-RNTI indices indicating at least one currently scheduled wireless device may be received by the wireless device. The C-RNTI indices may be mapped to at least one C-RNTI signature associated with the at least one currently scheduled wireless device. The C-RNTI indices indicating the at least one currently scheduled wireless device may be mapped to at least one C-RNTI signature that is associated with the at least one currently scheduled wireless device. Interference cancellation may be performed based on the C-RNTI signature associated with the at least one currently scheduled wireless device.

In another example embodiment, a network node for assigning radio network temporary identifiers (C-RNTI) signatures may include a memory containing executable instructions and one or more processors in communication with the memory. The one or more processors may be operable to execute the instructions to cause the network node to assign a subset of C-RNTI signatures to a cell. The network node may also define a mapping between the subset of C-RNTI signatures and a set of C-RNTI indices. Each C-RNTI signature within the subset may be identifiable by a first wireless device via the mapping. The network node may provide, to the first wireless device, a mapping between the subset of C-RNTI signatures and the set of C-RNTI indices. The network node may also provide, to the first wireless device, C-RNTI indices indicating at least one currently scheduled wireless device.

In still another example embodiment, a wireless device for retrieving C-RNTI signature information for performing interference cancellation may be provided. The wireless device may include a memory containing executable instructions and one or more processors in communication with the memory. The one or more processors operable to execute the instructions to cause the wireless device to receive, from a network node, a mapping between a subset of C-RNTI signatures and a subset of C-RNTI indices. The wireless device may also receive, from the network node, C-RNTI indices indicating at least one currently scheduled wireless device. The C-RNTI indices being mapped to at least one C-RNTI signature associated with the at least one currently scheduled wireless device. The wireless device may map the C-RNTI indices indicating the at least one currently scheduled wireless device to at least one C-RNTI signature that is associated with the at least one currently scheduled wireless device. The wireless device may then perform interference cancellation based on the C-RNTI signature associated with the at least one currently scheduled wireless device.

Some embodiments of the disclosure may provide one or more technical advantages. For example, in certain embodiments, broadcasting C-RNTI, as disclosed herein, may reduce the control signaling resources and/or the eNode B power used. One additional advantage may be that the saved resources may be used to broadcast additional C-RNTIs to enable interference cancellation with respect to more interfering signals. Additionally or alternatively, the save resources may be used to increase traffic data resources in the cell and, consequently, improve cell transmission points. Still another advantage may be that efficient C-RNTI signaling may include a mechanism for conveying the DCI format of the interfering cell PDCCH in LTE. As a result, reception of the control channel without undue blind format detection may be enabled. Still another advantage may be that C-RNTI allocation may be transparent to legacy wireless devices and not negatively affect link performance.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Radio networks may include components that may cooperate to perform interference cancellation. In certain embodiments, the network may operate to provide interference cancellation assistance signaling. Specifically, the network may identify and assign a specific set of C-RNTI signatures to specific wireless devices. The C-RNTI signatures may be mapped to C-RNTI indices, which may be provided to wireless devices. Additionally, transmission mode information may be provided in conjunction with or in addition to the C-RNTI indices. The wireless devices may use the received information for performing interference cancellation of interfering signals. Particular embodiments are described in FIGS. 1-16 of the drawings, like numerals being used for like and corresponding parts of the various drawings.

Figure 1:
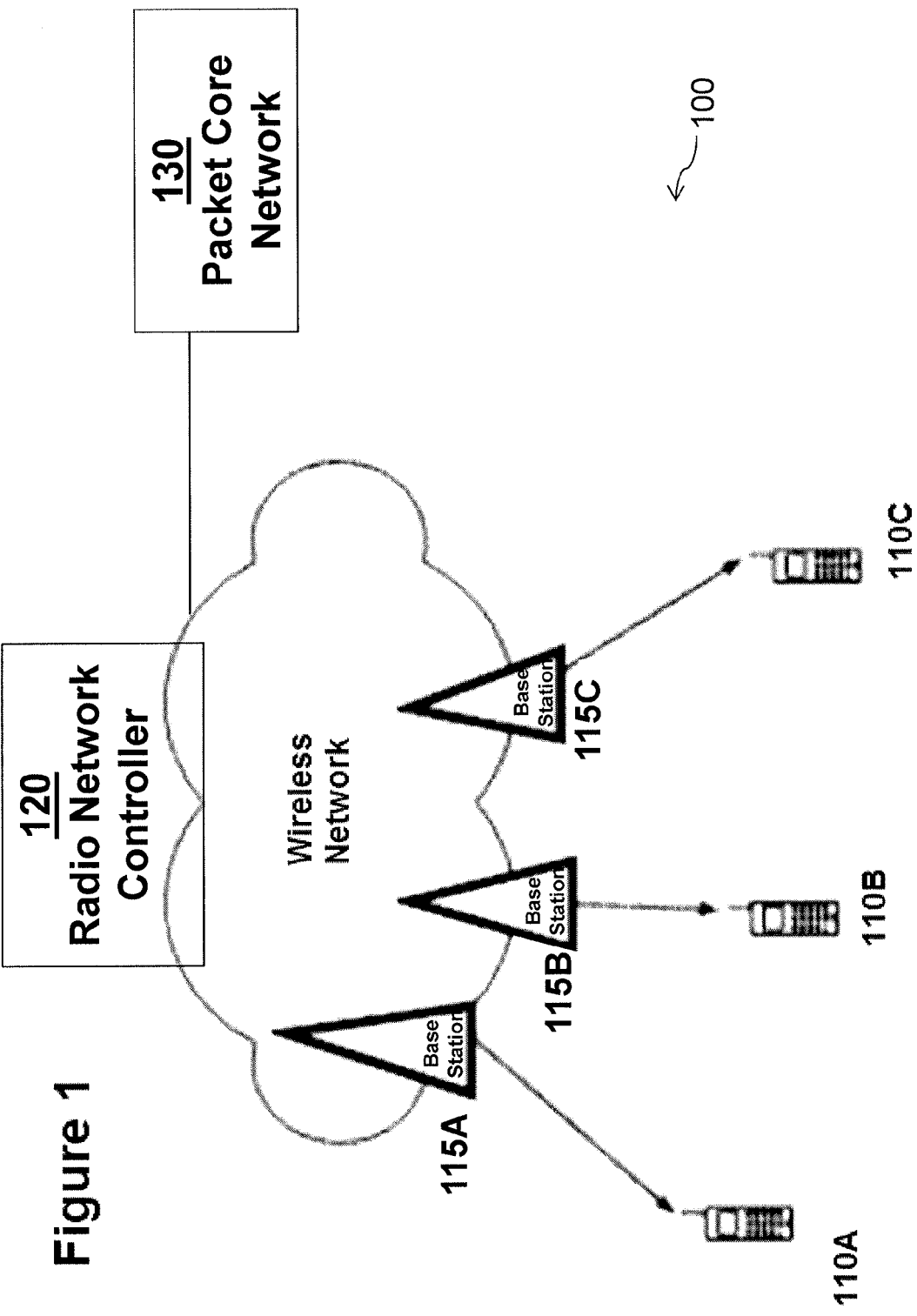
FIG. 1 is a block diagram illustrating a wireless telecommunications network, according to certain embodiments.

FIG. 1 is a block diagram illustrating embodiments of a radio network 100 for performing interference cancellation that includes one or more wireless devices 110, radio network nodes 115, radio network controller 120, and core network nodes 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionalities for wireless device 110. Wireless device 110 may exchange certain signals with core network node 130 using the non-access stratum layer. In non-access stratum signaling, signals between wireless device 110 and core network node 130 may be transparently passed through the radio access network.

As described above, example embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone). Each of wireless device 110, radio network node 115, radio network controller 120, and core network node 130 may include any suitable combination of hardware and/or software. Examples of particular embodiments of radio network node 115, wireless device 110, and network nodes (such as radio network controller 120 or core network node 130) are described with respect to FIGS. 7, 8, and 9 below, respectively.

The terms wireless device 110 and network node 115, as used herein, are considered general terms and are intended to be considered as non-limiting. For example, "network node" may correspond to any type of radio network node or any network node, which communicates with wireless device 110 and/or another network node 115. Examples of network nodes 115 may include but are not limited to Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Additionally, "wireless device" may be used interchangeably with user equipment (UE) and may refer to any type of wireless device communicating with a network node 115 and/or with another wireless device 110 in a cellular or mobile communication system. Examples of wireless devices 110 include target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles, or any other suitable wireless devices.

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as 3GPP Long Term Evolution (LTE) technology, which is a mobile broadband wireless communication technology in which transmissions from radio network nodes 115, which may include base stations such as those referred to as eNBs in particular embodiments, to wireless devices, which may also be referred to as user equipment (UE), are sent using orthogonal frequency division multiplexing (OFDM). OFDM splits the signal into multiple parallel subcarriers in frequency. The basic unit of transmission in LTE is a resource block (RB) which in its most common configuration consists of 12 subcarriers and 7 OFDM symbols (one slot). A unit of one subcarrier and 1 OFDM symbol is referred to as a resource element (RE). However, it is generally recognized that the disclosure is not limited to 3GPP LTE or other provided examples and other embodiments could use different radio access technologies.

Figure 2:
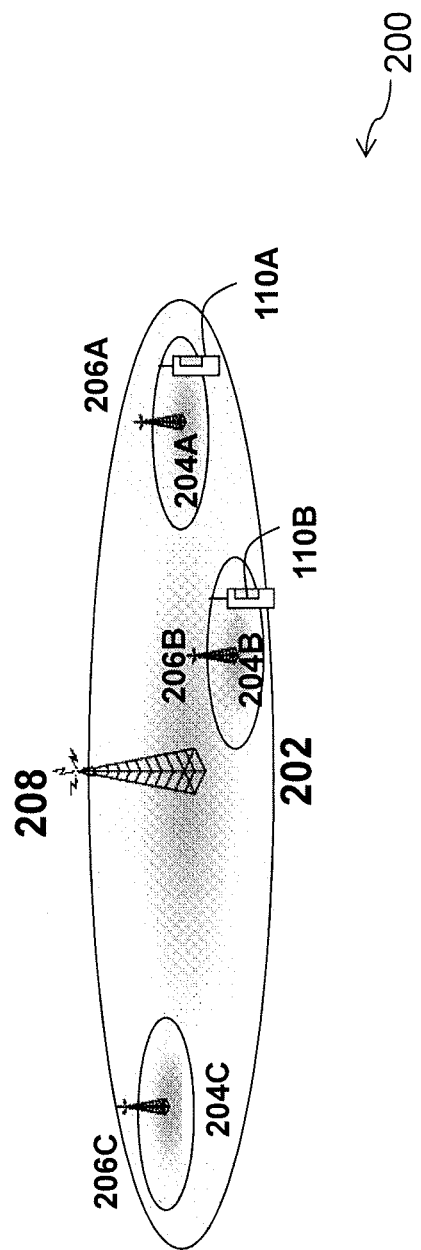
FIG. 2 is a schematic diagram of an example wireless telecommunications network deploying macro and pico cells, according to certain embodiments.

In order to meet higher capacity demands, the network 100 may comprise a heterogeneous network that includes a mixture of cells of different sizes and overlapping coverage areas. FIG. 2 is a schematic diagram of an example wireless telecommunications network 200 deploying macro cells 202 and pico cells 204, according to certain embodiments. As illustrated, network 200 includes one macro cell 202 that includes multiple pico cells 204A-C deployed within the coverage area of macro cell 202.

In particular embodiments, pico cells 204A-C may be served by lower power nodes 206A-206C that consume less power than network node 208. For example, whereas network node 208 serving macro cell 202 may be associated with an output power of 46 dBm, a lower power node 206A-C may be associated with an output power of 30 dBm or less. The large difference in output power may result in a different interference situation than what is seen in networks where all base stations have the same output power. Other examples of low power nodes, also referred to as points, in heterogeneous networks are home base stations and relays.

An objective of using low power nodes 206A-C within macro cell 202 is to improve system capacity by means of cell splitting gains. Another objective is to provide users with wide area experience of very high speed data access throughout network 200. Heterogeneous deployments are particularly effective in covering traffic hotspots, which may include small geographical areas with high user densities served by lower power nodes 206A-C, and represent an alternative deployment to denser macro networks.

Interference Cancellation (IC) receivers typically need signal configuration information for the interference signals they are to regenerate and remove. One way to obtain such information for neighbor-cell downlink (DL) signals is via receiving the associated DL control channel in that cell. Typically, each control message is masked with a target UE-specific sequence (16-bit C-RNTI in LTE) that may be hard or impossible to blindly decode. Accordingly, in certain embodiments, neighboring network nodes may signal the C-RNTI signatures of the currently scheduled wireless devices 110. Methods for reducing the message size of signaling information, such as C-RNTI, are described below.

In dense cellular deployments, interference mitigation techniques have the potential to substantially improve the user performance. As described above, interference mitigation can either take place on the transmitter side or on the receiver side, or a combination of both. On the receiver side, interference rejection combining (IRC) may be used to mitigate inter-cell interference for suppressing interference and uses estimation of an interference/noise covariance matrix. Other receiver types for interference mitigation are those based on interference cancellation (IC) in which unwanted received signals (intra/inter-cell interference) are estimated and subtracted from the received signals. However, LTE Rel.11 restricts interference cancellation to always-on signals, such as the CRS, in which the network assists wireless devices 110 on how these signals are transmitted in the aggressor cells in terms of number of CRS antenna ports and MBSFN patterns.

In many IC receiver architectures, some knowledge about the interfering signal may be required. For example, interference cancellation in advanced receivers such as wireless devices 110 may require that the wireless devices 110 determine at least a portion of the following: at least a subset of its resource allocation (resource blocks (RBs) in Long Term Evolution (LTE), high-speed Physical Downlink Shared Channel (HS-PDSCH) codes in High Speed Downlink Packet Access (HSDPA), modulation-related parameters (transmission modes (TM), modulation, MIMO rank, precoding weights, etc.), and coding-related parameters (transport block size, code rate, etc.). One way to obtain such information for neighbor-cell DL signals is via receiving the associated neighbor-cell DL control channel (PDCCH/ePDCCH in LTE, HS-SCCH in HSDPA). In interference limited cellular networks, a wireless device concerned about interference may enjoy sufficient signal quality to decode physical layer control messages associated with neighbor cell DL transmissions. After decoding such control messages such a wireless device 110 may know how data transmissions of neighbor cells were generated. Additionally, the wireless device 110 may know which physical resource blocks have been used for the particular data transmission.

In certain embodiments, each control message may be masked with a target UE-specific sequence. Stated differently, the control message may be specific to the wireless device for which it is intended. In LTE, a Cell Radio-Network Temporary Identifier (C-RNTI) is used by the serving eNode B to communicate with a specific wireless device 110 (UE). In HSDPA embodiments, H-RNTI or UE ID may be similarly used. As used herein, the term C-RNTI is used generally to indicate any configurable radio-network temporary identifier that may be device specific. Any one of multiple types of C-RNTIs may be used to mask control messages in the downlink.

Each wireless device 110 may be assigned an identification sequence by the network 200 at the time the serving cell relationship is established. For example, wireless device 110A in FIG. 2 may be assigned an identification sequence when wireless device 110A establishes a relationship with low power node 204A. In certain embodiments, the sequence allocation pattern may be dictated by 3GPP specifications. In other embodiments, the sequence allocation pattern may not be governed by any 3GPP specifications and may, for all intents and purposes, be considered random by the wireless devices 110.

For the purposes of interference cancellation, knowledge of the target UE identification sequence is needed for decoding the control message as well as for decoding the data message. Though it may be possible for a wireless device 110 to blindly deduce the sequence from the received control message, such blind decoding may utilize significant—and in the case of LTE, often excessive—processing in wireless device 110. Instead, the neighbor cell preferably signals the C-RNTI signatures of the currently scheduled wireless devices 110 over a broadcast channel that a victim wireless device 110 is able to decode. Thus, in the example of FIG. 2, first wireless device 110A may be able to decode C-RNTI signatures of a currently scheduled second wireless device 110B in neighboring cell 204B.

In certain embodiments, such as LTE, DL scheduling assignments masked with a C-RNTI may use one of the downlink control information (DCI) formats. Example DCI formats may include 1, 1A, 1B, 1D, 2, 2A, 2B, or 2C and may depend on the configured transmission mode. Currently, LTE supports ten transmission modes supported in LTE and each transmission mode is associated with a particular one of the previously described DCI formats. Similar to the UE identification sequence, wireless devices 110 may also use the correctly identified DCI format to decode the control message.

In certain other embodiments, a DL scheduling assignment may not be masked with C-RNTI. Such a DL scheduling assignment uses DCI format 1C and may refer to transmission of RACH responses, paging, and system information blocks (SIBs). The RNTIs used when scheduling paging and system information refer to P-RNTI and SI-RNTI, respectively.

Figure 3:
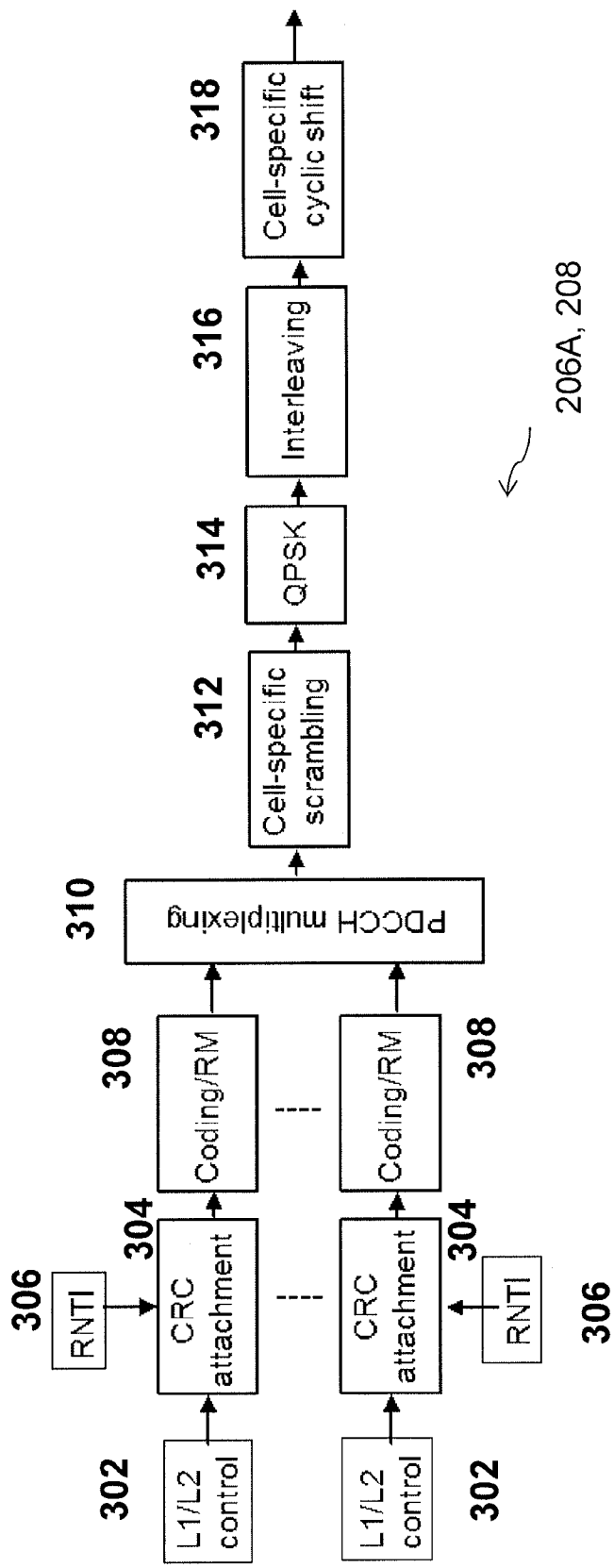
FIG. 3 is a block diagram illustrating the use of broadcasted C-RNTI(s) when decoding an interfering PDCCH, according to certain embodiments.

FIG. 3 is a block diagram illustrating the use of broadcasted C-RNTI(s) when decoding an interfering PDCCH. Specifically, FIG. 3 depicts the use of broadcasted C-RNTI(s) by a network node such as network node 206A of FIG. 2 in an LTE network 300. As depicted, L1/L2 control information 302 is received by cyclic redundancy check (CRC) components 304. Respective C-RNTIs 306 are masked into the cyclic redundancy check performed by CRCs 304. In particular embodiments, the masking of C-RNTI 306 may correspond to an XOR operation performed by CRCs 304. In certain embodiments, the L1/L2 302 control information is appended with CRC bits that are then encoded and rate matched by Coding/RM components 308 into a sequence of PDCCH bits. A serving network node 206 may schedule multiple PDCCHs, which are multiplexed by multiplexing component 310. Thereafter, network node 206A may operate to perform cell-specific scrambling on the multiplexed PDCCHs by cell-specific scrambling component 312. Further processing may be performed by a quadrature phase shift keying (QPSK) modulator 314, block interleaving of resource groups component 316, and/or a cell-specific cyclic shift component 318.

In certain embodiments, wireless device 110A may attempt to decode a DL scheduling assignment masked with a C-RNTI in accordance with the process depicted in FIG. 3. In a particular embodiment, wireless device 110A may only be required to monitor two DCI formats when the transmission mode (TM) of neighboring wireless device 110B is known. This may be the case for wireless devices 110A served by the network node 206A. However, where the wireless device 110A does not know the TM information of wireless device 110B, wireless device 110A may be required to monitor all possible DCI formats. As such, assistance signaling from network node 206a to inform first wireless device 110A of the TM of neighboring second wireless device 110B will improve the efficiency and accuracy of wireless device 110A. Using assistance TM information provided by network node 206A, first wireless device 110A may then decode a DL scheduling assignment masked with a C-RNTI of a neighbor cell transmission of PDCCH/ePDCCH intended for second wireless device 110B.

In certain embodiments, UE-specific signatures may be relatively long. Long signatures may enable a large number of active wireless device connections. Both in LTE and HSPA, for example, 16-bit signatures may be used. Consider then a situation where C-RNTIs for four wireless devices 110 are to be broadcasted. C-RNTIs for four devices 110 of 16 bits each results in a message of a length of 64 bits. For non-power-controlled broadcast transmission, the size of the resulting message may result in unfeasibly high DL power being allocated to provide the message. This may be true even where channel coding is applied. Additionally, the amount of time-frequency resources utilized for signaling may be great. By comparison, the PDCCH may carry messages of 70-bits. The HS-SCCH may carry messages of 21-bits.

Figure 4:
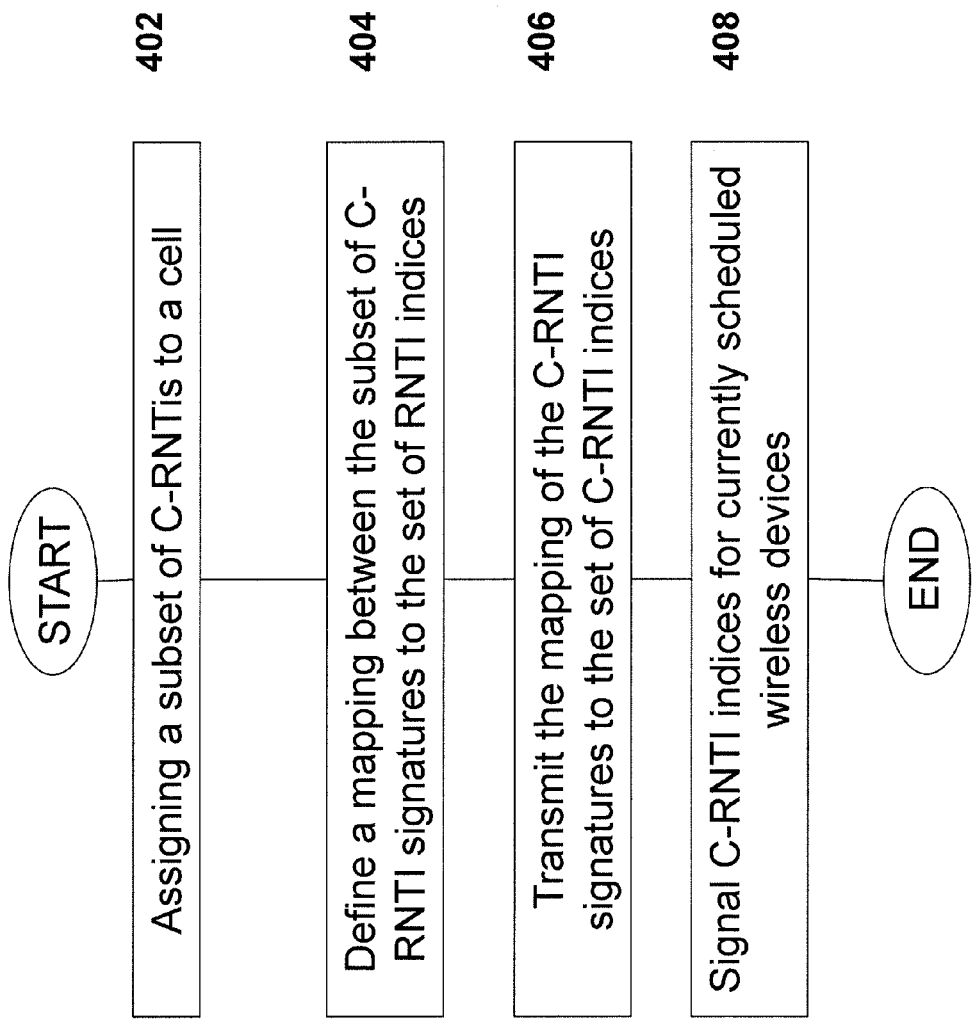
FIG. 4 is a schematic diagram depicting an example process flow for broadcasting C-RNTI within a network, according to certain embodiments.

FIG. 4 is a process flow diagram showing network operations for broadcasting C-RNTI in accordance with the present disclosure. Though a LTE network and LTE appropriate terms may be used as an example implementation choice, the process is not limited to an LTE network.

The method begins at step 402 when the network node assigns a subset of C-RNTI signatures to a cell. As described above, the assignment of C-RNTIs signatures is typically done in a random manner. However, in certain embodiments described herein, the assignment of C-RNTIs may be done in a non-random manner. Thus, instead of random allocation of C-RNTIs to wireless devices 110 by the network node 206 when they connect to a serving cell 204, a subset of the C-RNTI space may be defined so that the elements of this separate C-RNTI space may be indexed at step 404. For example, the C-RNTI space may be broken into at least two subsets. At least one portion of the C-RNTI space may include what may be referred to herein as "an efficient signaling set" or "E-set. In some implementations, the subset of C-RNTI space may have special structural properties.

For example, in certain embodiments, the E-set may consist of K M-bit sequences, $S_1 \ldots S_K$. As will be described below, the sequences $S_k$ may be used directly as E-set C-RNTIs in all cells, $E_k=S_k$. In other embodiments, the E-set values may be made cell-specific by additionally making them a function of the serving cell's cell ID (CID). For example, the sequences may be additionally masked (XOR-ed) with a CID-dependent sequence C, $E_k=S_k$ C. The CID-dependent sequence C may be the last M bits of the global CID. Alternatively, the CID-dependent sequence C may be the physical layer cell identity extended to M bits by prepending or appending a predetermined sequence (e.g., all zeros).

To obtain subsequent signaling efficiency, particular embodiments may include selecting the E-set to be significantly smaller than the allowable C-RNTI set. For example, where a 16 bit C-RNTI is allowed, the E-set may be selected to be less than the full 16-bit C-RNTI space. Thus, $K<<2^M$. In certain embodiments, the network node may apply the special C-RNTI allocation scheme to wireless devices 110 that are most likely to be transmitting DL data that could cause significant interference outside the wireless device's 110 own cell coverage area. For example, the special C-RNTI scheme may be applied to smartphones or dongles. Conversely, wireless devices 110 that have no DL transmissions or invoke infrequent and/or small DL transmissions may be allocated C-RNTIs outside the E-set. Thus, in particular embodiments, sensors or other M2M units may be allocated C-RNTIs outside the E-set.

Several different embodiments may be envisioned for identifying wireless devices 110 that should receive special E-set allocation:

The network node may observe the DL data transmission patterns of the served wireless devices 110 and change their C-RNTI allocation over time to or from the E-set accordingly.

The network node may allocate C-RNTIs from the special E-set to wireless devices 110 that are likely to use as much coding as possible on their PDCCH/ePDCCH channels and as low MCS as possible on PDSCH. These transmissions are more likely to be decodable by wireless devices 110 in other cells. As a result, the network may not be required to artificially lower the MCS in aggressor cells for the sake of decodability by these wireless devices 110 in other cells.

The network node may allocate C-RNTIs from the special E-set to wireless devices 110 that are likely to receive high-rank transmissions since multi-layer transport formats may constitute more detrimental interference than single-layer signals. The UE category info and DL transmission statistics for a wireless device 110 may be used to apply this criterion.

Because the C-RNTI signature is used by a wireless device 110 for identifying control messages targeted to the wireless device 110, it may be desirable for the E-set elements to have good Hamming distance properties, in a particular embodiment. For example, the C-RNTI length may be M bits and the desired E-set size may be K, where preferably K is a power of 2, $K=2^Q$. The design of the underlying E-set signature structure may then be equivalent of a sphere-packing problem where K points are placed in M-dimensional space so that the smallest inter-point distance may be maximized. Solutions to this problem are closely related to error-correcting code design. In certain embodiments, code words of classical (M,Q) codes, e.g. a Golay code, may be used as the entries of the E-set.

At step 406, the C-RNTI signature to C-RNTI indices mapping is transmitted to wireless device 110 in a first transmission. In certain embodiments, signaling of the device-specific C-RNTIs used by the cell and the mapping of the C-RNTIs to indices for the wireless devices 110 in the cell may be achieved by signaling the E-set as part of the broadcasted and scheduled system information. Thus, in a particular embodiment, the signature to indices mapping may be provided in a signal that includes the PDCCH masked with SI-RNTI. Such an approach may be used in cases when the subset of C-RNTIs is not to be changed frequently since any system information change may trigger wireless device 110 to re-acquire all system information. In an LTE specific embodiment, for example, wireless device 110 can expect a limited number of system information updates per hour.

In LTE, a connected wireless device 110 is notified of a system information change in the serving cell of the wireless device 110 via a bit in the system information block type 1 (SIB1) or via paging. However, a wireless device 110 is typically not notified of system information changes in neighboring cells. Thus, a wireless device 110 performing inter-cell IC may monitor the system information change notification bit of the SIB1 of the neighbor cells, in a particular embodiment. Alternatively, a system information change in a neighbor cell may allow the wireless device 110 to only read the system information carrying the E-set.

In certain other embodiments, the signaling of the E-set may be achieved by broadcasting or scheduling a message masked with a particular E-set-RNTI. This E-set-RNTI could be cell specific and broadcasted as part of the system information masked with SI-RNTI. Alternatively, the signal could be pre-specified and/or implicitly given by the physical layer cell identity. In still other embodiments, the E-set-RNTI may be network specific and the same in all cells.

The timing for sending the E-set may also be part of the scheduled system information with PDCCH masked with SI-RNTI, in certain embodiments. Alternatively, it could be non-configurable and occur at pre-specified time instants. In still other embodiments, the timing may be implicitly given by the physical layer identity. An advantage of signaling the E-set via scheduled system information masked with SI-RNTI may be that a change of the E-set would not trigger a wireless device 110 to start acquiring all system information. Additionally, the wireless device 110 may be expected to always read this information whether or not it has been changed. The periodicity of this signaling may not be expected to be shorter than seconds, or perhaps minutes, in particular embodiments.

At step 408, the network node may signal a message identifying C-RNTI indices associated with at least one currently scheduled device. Wireless device 110 may receive the C-RNTI indices and identify at least one C-RNTI signature included in the previously received mapping of C-RNTI signatures to C-RNTI indices. As described above, transmission of C-RNTI indices for currently scheduled wireless devices 110 may comprise a smaller message than sending each C-RNTI signature listed individually. In a particular embodiment, the preamble of the message may indicate a number of C-RNTIs contained in the message. Alternatively, the message may identify a first C-RNTI associated with a beginning of a range of C-RNTIs and a second C-RNTI associated with an ending of the range. Thus, rather than send all C-RNTIs that may be considered by wireless device 110, the network node may transmit just two C-RNTIs. However, the receiving wireless device may refer to the mapping of C-RNTI signatures to the set of C-RNTI indices to determine properties relating to a potentially interfering signal.

Figure 5:
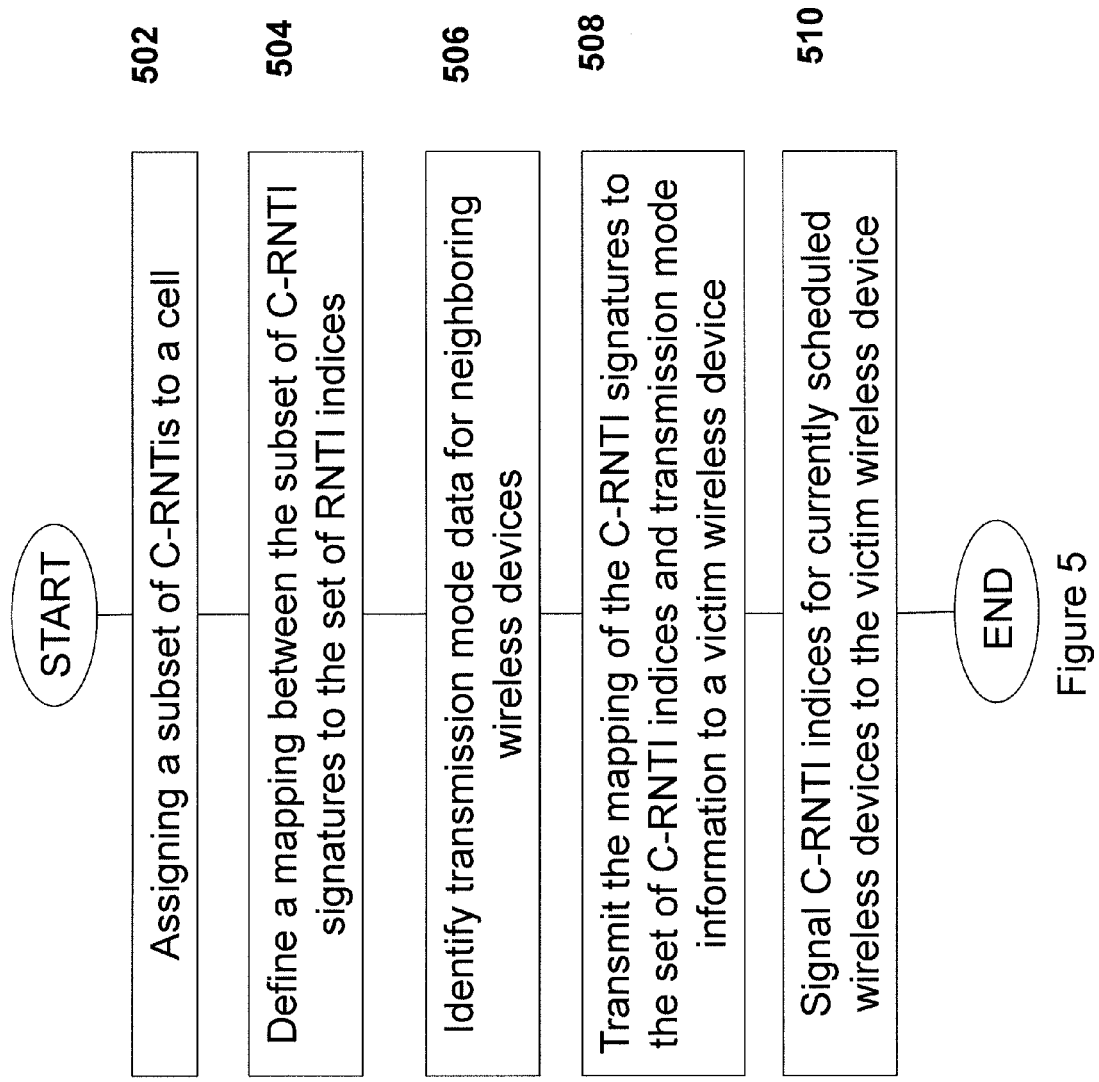
FIG. 5 is a schematic diagram depicting an example process flow for broadcasting C-RNTI and transmission mode information within a network, according to certain embodiments.

FIG. 5 is a schematic diagram depicting an example process flow for broadcasting C-RNTI and transmission mode information within a network, according to certain embodiments. Many of the steps of FIG. 5 are similar to those described above with regard to FIG. 4. For example, the method begins at step 502 when the network node assigns a subset of C-RNTI signatures to a cell. As described above, instead of randomly allocation of C-RNTIs to wireless devices 110 by the network node 206 when they connect to a serving cell 204, a subset of the C-RNTI space may be defined so that the elements of this separate C-RNTI space may be indexed at step 504. The assignment of the subset of C-RNTI signatures and the definition of the mapping of the C-RNTI signatures to the set of C-RNTI indices may be similar to steps 402 and 404 described above.

At step 506, transmission mode data may be identified for neighboring wireless devices 110. The transmission mode data of a neighboring cell transmission may then be signaled together with the mapping information at step 508. Accordingly, in certain embodiments, the transmission mode data may be signaled together with the mapping of the C-RNTI signatures to the set of C-RNTI indices. In a particular embodiment, the transmission mode information may be explicitly linked to the corresponding C-RNTI signature. Whereas the explicit signaling of the transmission mode may be a more flexible solution, the cost of increased control signaling may be prohibitive.

In another embodiment, the transmission mode information may be implicitly linked by associating each transmission mode to specific C-RNTIs of the subset of possible C-RNTI signatures. One method for implicitly indicating the transmission mode may be to introduce multiple subsets of C-RNTIs. Each subset of C-RNTIs may be associated with a specific transmission mode. Another approach may be to implicitly indicate the transmission mode using some bits of the C-RNTI since only a few transmission modes are typically used by a cell. For example, in a cell operating with one CRS based transmission mode and one DMRS based transmission mode only one bit of the C-RNTI signature is required to indicate the transmission mode.

At step 508, the network node may then signal a message identifying RNTI indices associated with at least one currently scheduled wireless device. Wireless device 110 may receive the C-RNTI indices and identify at least one C-RNTI signature included in the previously received mapping of C-RNTI signatures to C-RNTI indices. The wireless device 110 may also determine the transmission mode associated with such interfering devices and use this information to perform interference cancellation for at least one currently scheduled device.

Though static E-set C-RNTI signaling is described above, it is recognized that the methods depicted in FIGS. 4 and 5 may be modified for dynamic assignment of E-set C-RNTIs. For example, the E-set definition makes it possible to broadcast the C-RNTIs of currently scheduled wireless devices with significantly less control channel resource allocation and/or lower control channel power allocation. Specifically, if N interfering signal RNTIs are signaled, then N×Q bits instead of N×M are broadcasted. For example, if in a particular embodiment Q=4 (16 wireless devices in the E-set) and M=16, transmission power may be reduced by approximately M/Q=4 while maintaining the same coverage and reliability. Each Q-bit index may then be mapped to a corresponding C-RNTI value upon receiving the signaling in a given transmission time interval.

In certain embodiments, the number of signaled C-RNTIs N may be fixed, and at each transmission time interval, N×Q bits are broadcasted using a fixed signaling format and power setting. If less than N actual transmissions are ongoing, the remaining C-RNTI fields are filled with a predetermined and reserved sequence implying no transmission. For example, in a particular embodiment, the remaining C-RNTI fields may be filled with all ones. If more than N actual transmissions are ongoing, the network node may select the N transmissions with the largest inter-cell interference impact, e.g. based on the TX power, TM, beamforming or precoding properties, decodability at victim wireless devices 110, etc.

In certain other embodiments, the signaling format and/or power setting may be adapted by the network node according to the actual number of significant interference signals from the cell during the current transmission time interval. The code rate and/or the allocated power of the broadcast message may be changed dynamically to guarantee desired broadcast coverage without unnecessarily wasting transmission power. For example, if N is small, a low code rate may be applied and the transmission power of the broadcast message may be lowered. A preamble in the message may indicate the number of C-RNTIs contained in the message.

In still other embodiments, and as described above, the range of currently scheduled E-set C-RNTIs may be signaled by indicating the relevant first and last indices in the E-set. In this approach, only 2Q bits per broadcast message need to be signaled. The message may then be assumed by wireless device 110 to imply that any of the C-RNTIs within the range may be active in the current transmission time period.

More advanced compression and source coding approaches may be used to further improve the broadcast efficiency without deviating from the spirit of that which is disclosed. For example, in a particular embodiment, the E-set RNTI index broadcast channel may be configured in LTE as a broadcast/group-cast data channel who's PDCCH is masked with a "NAICS-RNTI" signature. The signature may be a predetermined sequence known to all wireless devices 110, and may be the same in all cells or, as described above, be a function of the cell ID. Such a broadcast channel may be implemented in other ways, including using ePDCCH, possibly amended with support for a common search space, or using a completely new physical channel that supports broadcast signaling. The rate and transmission power of the E-set index broadcast channel may be set so as to guarantee reliable reception into parts of the neighbor cells where the C-RNTI information is of interest. In some embodiments, the antenna downtilt may be electrically reduced for the E-set C-RNTI broadcast channel to improve the coverage into neighboring cells.

Figure 6:
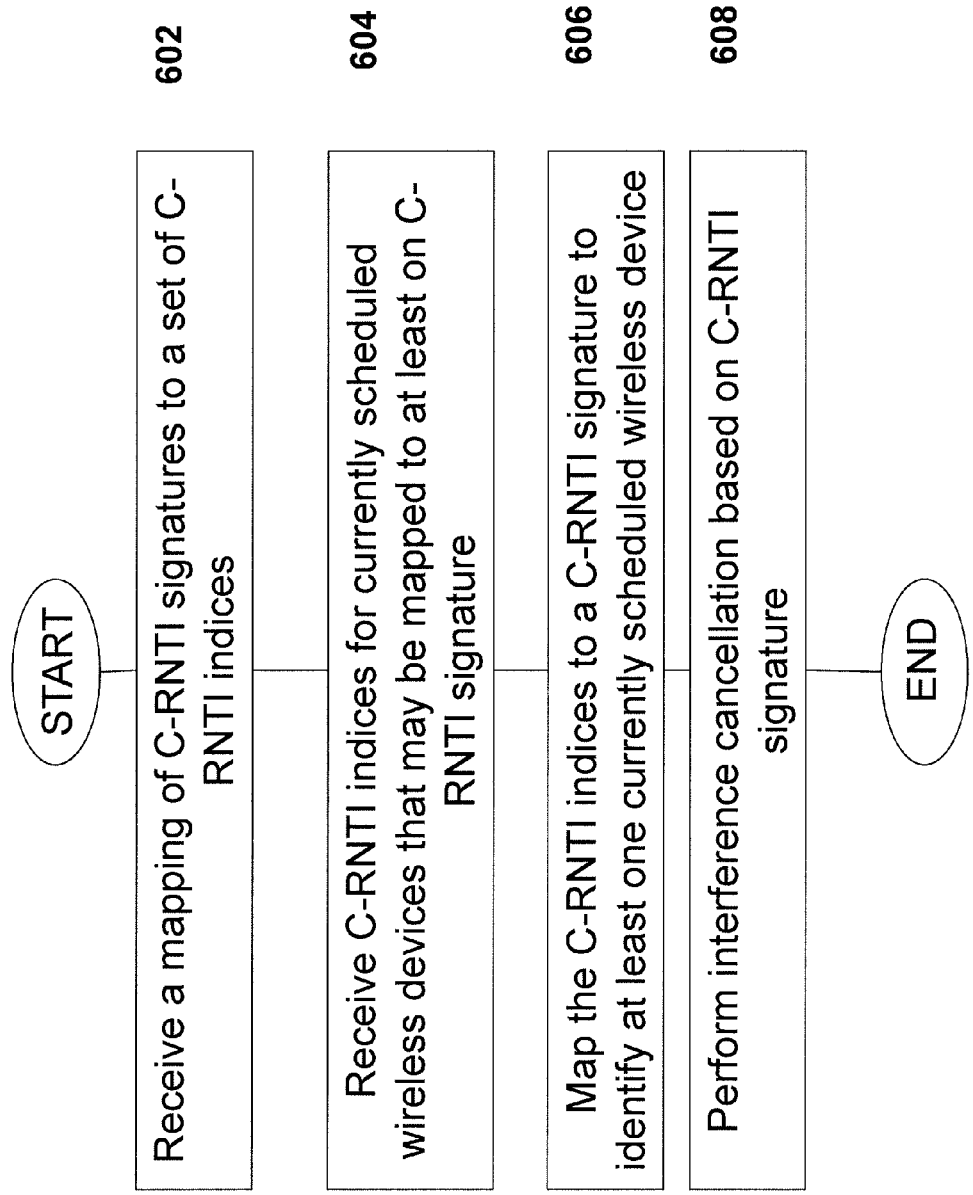
FIG. 6 is a schematic diagram depicting an example process flow for receiving and processing C-RNTI in a wireless network device, according to certain embodiments.

FIG. 6 is a schematic diagram depicting an example process flow for receiving and processing C-RNTI in a wireless network device. As depicted, the method starts at step 602 with the wireless device 110 receiving a mapping of C-RNTI signatures to a set of C-RNTI indices. In certain embodiments, the mapping may include a control message masked with the set of C-RNTI indices. As described above, with regard to FIG. 5, the mapping information may include transmission mode information in particular embodiments. The transmission mode information may be specific to the cell associated with the mapping between the subset of C-RNTI signatures and the set of C-RNTI indices.

At step 604, wireless device receives one or more C-RNTI indices associated with currently scheduled wireless devices 110. Wireless device 110 may then map the C-RNTI indices for the currently scheduled wireless devices to at least one C-RNTI signature in the mapping at step 606. At step 608, wireless device 110 performs interference cancellation based on the C-RNTI signature associated with the at least one currently scheduled wireless device 110.

In certain embodiments, performing interference cancellation by wireless device 110 may include identifying neighbor cells with significant interference potential based on, for example, cell search and CRS measurements. For each such cell, and also including its own cell (in the case of MU-MIMO), wireless device may perform a number of operations. For example, wireless device 110 reads higher-layer signaling to obtain E-set to C-RNTI mapping information. As another example, wireless device 110 may read the E-set C-RNTI broadcast channel. Depending on the protocol used, wireless device 110 may decode the contents based on the fixed format or the format info in the preamble.

In still other embodiments, interference cancellation by wireless device 110 may include blind decoding according to several format hypotheses. For example, wireless device 110 may be provided with a list of indices that wireless device 110 may then convert into actual C-RNTI sequences according to the predetermined scheme. Wireless device 110 may also be provided with the associated DCI. In a particular embodiment, wireless device 110 may demodulate and decode the PDCCH (or ePDCCH) according to the obtained DCI for the different possible formats utilizing the list of C-RNTIs received from the broadcast channel. Wireless device 110 may store interferer signal configuration info from successful decoding results. In still other embodiments, wireless device 110 may demodulate and, optionally, decode PDSCH according to the signal configuration list previously obtained. Wireless device 110 may regenerate transmitted and received symbol estimates of PDSCH (and optionally PDCCH) for the cell and subtract the regenerated signal from the total received signal.

The interference-mitigated received signal is then used to demodulate and decode the desired signal from the own cell.

Figure 7:
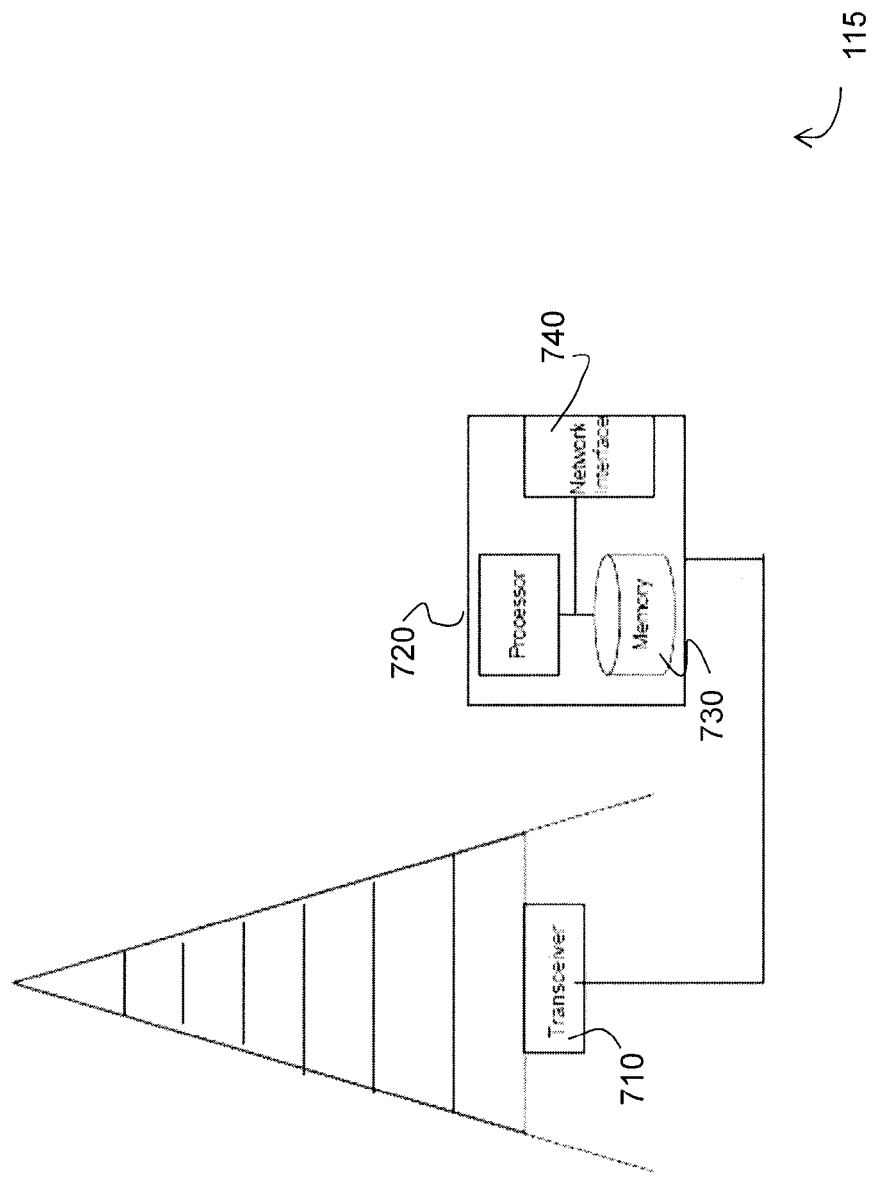
FIG. 7 is a block diagram illustrating certain embodiments of a wireless device, according to certain embodiments.

FIG. 7 is a block diagram illustrating certain embodiments of a radio network node 115. Examples of radio network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH), etc. Radio network nodes 115 may be deployed throughout network 100 as a homogenous deployment, heterogeneous deployment, or mixed deployment. A homogenous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 710, processor 720, memory 730, and network interface 740. In some embodiments, transceiver 710 facilitates transmitting wireless signals to and receiving wireless signals from wireless device 110 (e.g., via an antenna), processor 720 executes instructions to provide some or all of the functionality described above as being provided by a radio network node 115, memory 730 stores the instructions executed by processor 720, and network interface 740 communicates signals to backend network components, such as a gateway, switch, router, Internet, Public Switched Telephone Network (PSTN), core network nodes 130, radio network controllers 120, etc.

Processor 720 may include any suitable combination of hardware and software implemented in one or more modules to execute instructions and manipulate data to perform some or all of the described functions of radio network node 115. In some embodiments, processor 720 may include, for example, one or more computers, one or more central processing units (CPUs), one or more microprocessors, one or more applications (CPUs), and/or other logic.

Memory 730 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for radio network node 115, send output from radio network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of radio network node 115 may include additional components beyond those shown in FIG. 7 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 8:
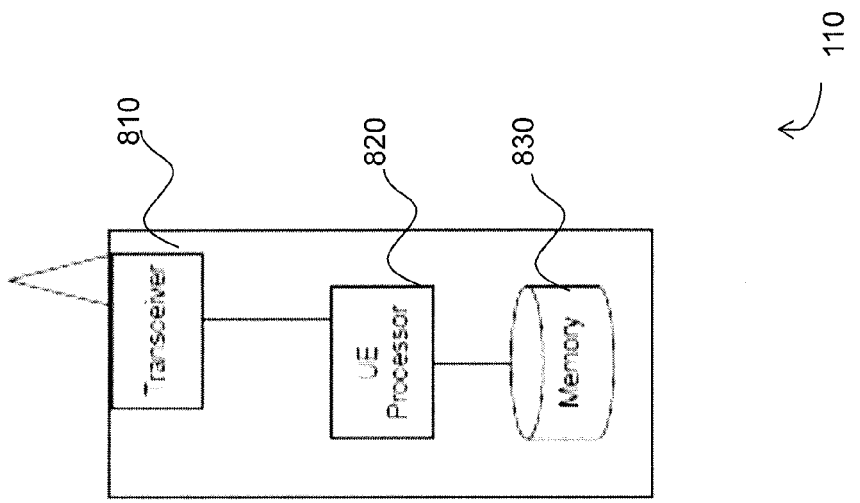
FIG. 8 is a block diagram illustrating certain embodiments of a radio network node, according to certain embodiments.

FIG. 8 is a block diagram illustrating certain embodiments of a wireless device 110. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 810, processor 820, and memory 830. In some embodiments, transceiver 810 facilitates transmitting wireless signals to and receiving wireless signals from radio network node 115 (e.g., via an antenna), processor 820 executes instructions to provide some or all of the functionality described above as being provided by wireless device 110, and memory 830 stores the instructions executed by processor 820.

Processor 820 may include any suitable combination of hardware and software implemented in one or more modules to execute instructions and manipulate data to perform some or all of the described functions of wireless device 110. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above).

Figure 9:
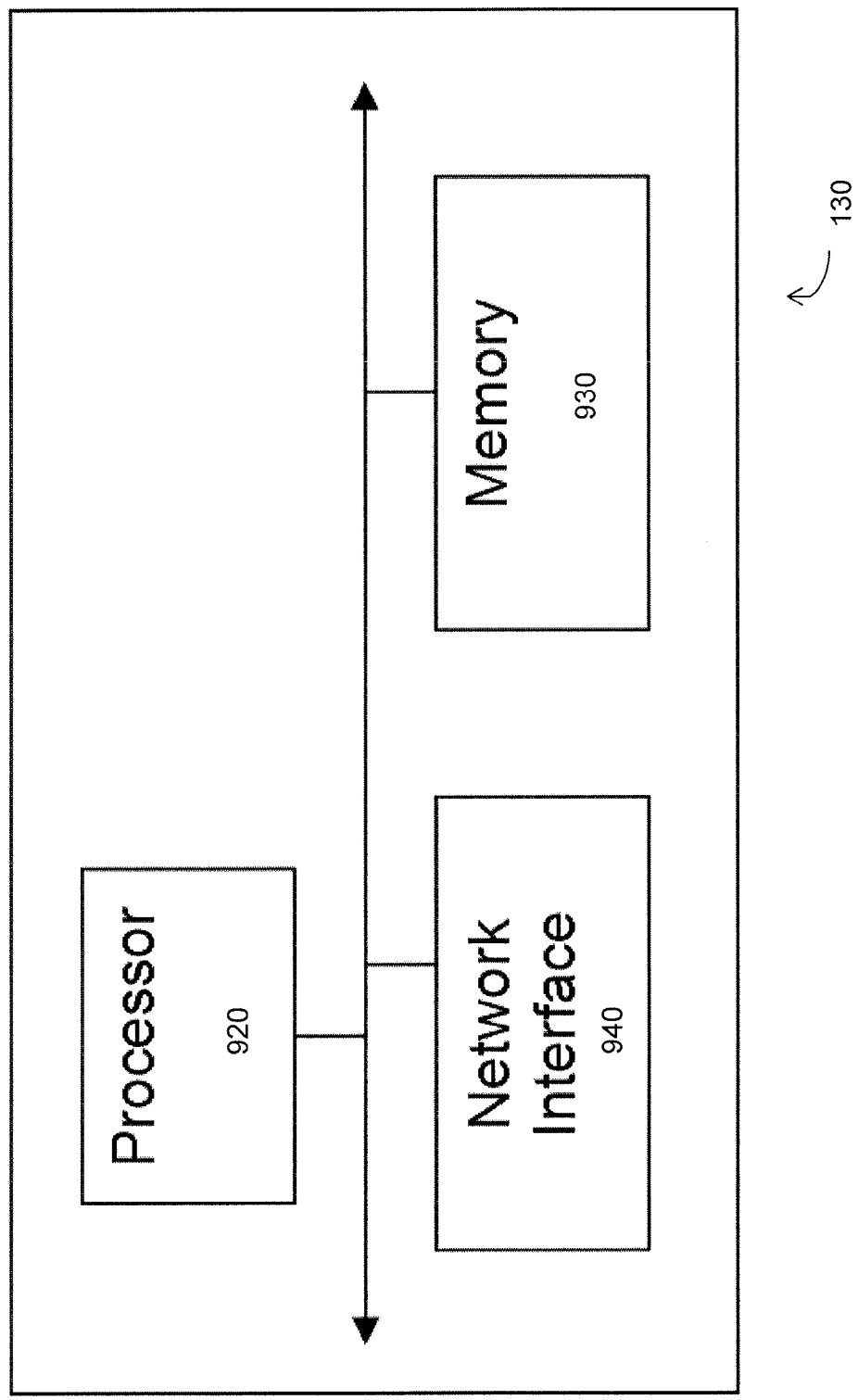
FIG. 9 is a block diagram illustrating certain embodiments of a core network node, according to certain embodiments.

FIG. 9 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to a suitable node, such as a gateway, switch, router, Internet, Public Switched Telephone Network (PSTN), radio network nodes 115, radio network controllers 120, core network nodes 130, etc.

Processor 920 may include any suitable combination of hardware and software implemented in one or more modules to execute instructions and manipulate data to perform some or all of the described functions of the network node. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Some embodiments of the disclosure may provide one or more technical advantages. For example, in certain embodiments, broadcasting C-RNTI, as disclosed herein, may reduce the control signaling resources and/or the eNode B power used. One additional advantage may be that the saved resources may be used to broadcast additional C-RNTIs to enable interference cancellation with respect to more interfering signals. Additionally or alternatively, the save resources may be used to increase traffic data resources in the cell and, consequently, improve cell transmission points. Still another advantage may be that efficient C-RNTI signaling may include a mechanism for conveying the DCI format of the interfering cell PDCCH in LTE. As a result, reception of the control channel without undue blind format detection may be enabled. Still another advantage may be that C-RNTI allocation may be transparent to legacy wireless devices and not negatively affect link performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The invention claimed is:

1. A method for providing device-specific radio network temporary identifies (C-RNTI) signatures by a network node for interference cancellation, comprising:
   assigning, by the network node, a subset of C-RNTIs to a cell;
   defining, by the network node, a mapping between the subset of C-RNTI signatures and a set of C-RNTI indices, each C-RNTI signature within the subset being identifiable by a first wireless device via the mapping;
   providing, to the first wireless device, the mapping between the subset of C-RNTI signatures and the set C-RNTI indices; and
   providing, to the first wireless device, C-RNTI indices indicating at least one currently scheduled wireless device.

2. The method of claim 1, wherein the C-RNTI indices indicating the at least one currently scheduled wireless device is smaller than N×M bits, where M is a length of the C-RNTI signature in bits and N is a number of currently scheduled wireless devices.

3. The method of claim 1, wherein the mapping between the set of C-RNTI indices and the subset of C-RNTI signatures is transmitted to the first wireless device via signaling or broadcasting.

4. The method of claim 1, wherein transmission mode information is provided with the C-RNTI indices indicating the at least one currently scheduled wireless device, the transmission mode information specific to the cell associated with the mapping between the subset of C-RNTI signatures and the set of C-RNTI indices.

5. The method of claim 1, wherein the assignment of the subset of C-RNTI signatures to the cell are determined as a function of a cell identifier and are cell specific.

6. The method of claim 1, wherein assigning a subset of C-RNTI signatures to a cell comprises:
   observing one or more downlink data transmission patterns of the at least one currently scheduled wireless devices; and
   determining that the at least one currently scheduled wireless device is likely to produce interference.

7. The method of claim 1, wherein the mapping is broadcast as a control message masked with a particular RNTI associated with the subset of C-RNTIs.

8. The method of claim 7, wherein the particular RNTI is signaled by a control message masked with a SI-RNTI.

9. The method of claim 7, wherein the particular RNTI is pre-specified.

10. The method of claim 1, wherein:
    the assignment of the subset of C-RNTI signatures is cell specific: and
    the mapping is broadcast with scheduled system information with PDCCH masked with an SI-RNTI.

11. The method of claim 1, wherein the mapping is broadcast at pre-specified time instants.

12. The method of claim 11, wherein the pre-specified time instants are configurable and signaled by a control messaged masked with a SI-RNTI.

13. The method of claim 1, wherein a preamble of a message associated with the transmission of the C-RNTI indices indicating the at least one currently scheduled wireless device indicates a number of C-RNTI signatures contained in the message.

14. The method of claim 1, wherein the C-RNTI indices indicating the at least one currently scheduled wireless device comprises:
    a first C-RNTI signature associated with a beginning of a range of C-RNTI signatures; and
    a second C-RNTI signature associated with an ending of the range of C-RNTI signatures.

15. A method for retrieving C-RNTI signature information for performing interference cancellation by a wireless device, the method comprising:
    receiving, by the wireless device, a mapping between a subset of C-RNTI signatures and a subset of C-RNTI indices, the mapping received from a network node;
    receiving, by the wireless device, C-RNTI indices indicating at least one currently scheduled wireless device, the C-RNTI indices being mapped to at least one C-RNTI signature associated with the at least one currently scheduled wireless device;
    mapping, by the wireless device, the C-RNTI indices indicating the at least one currently scheduled wireless device to at least one C-RNTI signature that is associated with the at least one currently scheduled wireless device; and
    performing, by the wireless device, interference cancellation based on the C-RNTI signature associated with the at least one currently scheduled wireless device.

16. The method of claim 15, wherein transmission mode information is included with the C-RNTI indices indicating the at least one currently scheduled device, the transmission mode information specific to the cell associated with the mapping between the subset of C-RNTI signatures and the set of C-RNTI indices.

17. The method of claim 15, wherein the mapping is broadcast as a control message masked with a particular RNTI associated with the subset of C-RNTIs.

18. The method of claim 17, wherein the particular RNTI is signaled by a control message masked with a SI-RNTI.

19. The method of claim 17, wherein the particular RNTI is pre-specified.

20. The method of claim 15, wherein:
    the subset of C-RNTI signatures is cell specific; and
    the mapping is broadcast with scheduled system inform nation with PDCCH masked with an SI-RNTI.

21. The method of claim 15, wherein a preamble of a message associated with the transmission of the C-RNTI indices indicating the at least one currently scheduled wireless device includes a number of C-RNTI signatures contained in the message.

22. The method of claim 15, wherein the C-RNTI indices indicating the at least one currently scheduled wireless device comprises:
    a first C-RNTI signature associated with a beginning of a range of C-RNTI signatures; and
    a second C-RNTI signature associated with an ending of the range of C-RNTI signatures.

23. The method of claim 15, wherein performing interference cancellation comprises:
    demodulating an interference signal associated with the least one currently scheduled wireless device associated with the C-RNTI signature;
    decoding a PDSCH of the interference signal;
    producing an estimate of the interference signal associated with the at least one currently scheduled wireless device associated with the C-RNTI signature;
    regenerating the interference signal based on the decoded PDSCH and the estimate of the interference signal; and
    subtracting the regenerated interference signal from a total received signal, wherein removal of the estimate improves an effective signal-to-noise ratio for the total received signal.

24. A network node for assigning radio network temporary identifiers (C-RNTI) signatures, the network node comprising:
memory containing executable instructions; and
one or more processors in communication with the memory, the one or more processors operable to execute the instructions to cause the network node to:
assign a subset of C-RNTI signatures to a cell;
define a mapping between the subset of C-RNTI signatures and a set of C-RNTI indices, each C-RNTI signature within the subset being identifiable by a first wireless device via the mapping;
provide, to the first wireless device, a mapping between the subset of C-RNTI signatures and the set of C-RNTI indices; and
provide, to the first wireless device, C-RNTI indices indicating at least one currently scheduled wireless device.

25. The network node of claim 24, wherein the C-RNTI indices indicating the at least one currently scheduled wireless device is smaller than N×M bits, where M is a length of the C-RNTI signature in bits and N is a number of currently scheduled wireless devices.

26. The network node of claim 24, wherein the mapping between the set of C-RNTI indices and the subset of C-RNTI signatures is transmitted to the first wireless device via signaling or broadcasting.

27. The network node of claim 24, wherein the one or more processors are further operable to cause the network node to provide transmission mode information with the C-RNTI indices indicating the at least one currently scheduled wireless device, the transmission mode information specific to the cell associated with the mapping between the subset of C-RNTI signatures and the set of C-RNTI indices.

28. The network node of claim 24, wherein the assignment of the subset of C-RNTI signatures to the cell are determined as a function of a cell identifier and are cell specific.

29. The network node of claim 24, wherein when assigning a subset of C-RNTI signatures to a cell the network node is further operable to:
observe one or more downlink data transmission patterns of the at least one currently scheduled wireless devices; and
determine that the at least one currently scheduled wireless device is likely to produce interference.

30. The network node of claim 24, wherein the mapping is broadcast as a control message masked with a particular RNTI associated with the subset of C-RNTIs.

31. The network node of claim 30, wherein the particular RNTI is signaled by a control message masked with a SI-RNTI.

32. The network node of claim 30, wherein the particular RNTI is pre-specified.

33. The network node of claim 24, wherein:
the assignment of the subset of C-RNTI signatures is cell specific; and
the mapping is broadcast with scheduled system information with PDCCH masked with an SI-RNTI.

34. The network node of claim 24, wherein the mapping is broadcast at pre-specified time instants.

35. The network node of claim 34, wherein the pre-specified time instants are configurable and signaled by a control messaged masked with a SI-RNTI.

36. The network node of claim 24, wherein a preamble of a message associated with the transmission of the C-RNTI indices indicating the at least one currently scheduled wireless device includes a number of C-RNTI signatures contained in the message.

37. The network node of claim 24, wherein the C-RNTI indices indicating the at least one currently scheduled wireless device comprises:
a first C-RNTI signature associated with a beginning of a range of C-RNTI signatures; and
a second C-RNTI signature associated with an ending of the range of C-RNTI signatures.

38. A wireless device for retrieving C-RNTI signature information for performing interference cancellation, the wireless device comprising:
memory containing executable instructions; and
one or more processors in communication with the memory, the one or more processors operable to execute the instructions to cause the wireless device to:
receive, from a network node, a mapping between a subset of C-RNTI signatures and a subset of C-RNTI indices;
receive, from the network node, C-RNTI indices indicating at least one currently scheduled wireless device, the C-RNTI indices being mapped to at least one C-RNTI signature associated with the at least one currently scheduled wireless device;
map the C-RNTI indices indicating the at least one currently scheduled wireless device to at least one C-RNTI signature that is associated with the at least one currently scheduled wireless device; and
perform interference cancellation based on the C-RNTI signature associated with the at least one currently scheduled wireless device.

39. The wireless device of claim 38, wherein transmission mode information is included with the C-RNTI indices indicating the at least one currently scheduled device, the transmission mode information specific to the cell associated with the mapping between the subset of C-RNTI signatures and the set of C-RNTI indices.

40. The wireless device of claim 38, wherein the mapping is received as a control message masked with a particular RNTI associated with the subset of C-RNTIs.

41. The wireless device of claim 40, wherein the particular RNTI is signaled by a control message masked with a SI-RNTI.

42. The wireless device of claim 40, wherein the particular RNTI is pre-specified.

43. The wireless device of claim 38, wherein:
the subset of C-RNTI signatures is cell specific; and
the mapping is broadcast with scheduled system information with PDCCH masked with an SI-RNTI.

44. The wireless device of claim 38, wherein a preamble of a message associated with the transmission of the C-RNTI indices indicating the at least one currently scheduled wireless device includes a number of C-RNTI signatures contained in the message.

45. The wireless device of claim 38, wherein the C-RNTI indices indicating the at least one currently scheduled wireless device comprises:
a first C-RNTI signature associated with a beginning of a range of C-RNTI signatures; and
a second C-RNTI signature associated with an ending of the range of C-RNTI signatures.

46. The wireless device of claim 38, wherein, when performing interference cancellation, the wireless device is further operable to:

demodulate an interference signal associated with the least one currently scheduled wireless device associated with the C-RNTI signature;

decode a PDSCH of the interference signal;

produce an estimate of the interference signal associated with the at least one currently scheduled wireless device associated with the C-RNTI signature;

regenerate the interference signal based on the decoded PDSCH and the estimate of the interference signal; and subtract the regenerated interference signal from a total received signal, wherein removal of the estimate improves an effective signal-to-noise ratio for the total received signal.

* * * * *